US009657789B2

(12) United States Patent
Castellana et al.

(10) Patent No.: US 9,657,789 B2
(45) Date of Patent: May 23, 2017

(54) DISC BRAKE CALIPER WITH REDUCED AXIAL DIMENSION

(71) Applicant: FRENI BREMBO S.P.A., Curno, Bergamo (IT)

(72) Inventors: Mirko Castellana, Bergamo (IT); Diego Comito, Bergamo (IT); Cristian Crippa, Bergamo (IT); Massimo Raffaeli, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 14/392,082

(22) PCT Filed: Mar. 17, 2014

(86) PCT No.: PCT/IB2014/059902
§ 371 (c)(1),
(2) Date: Sep. 16, 2015

(87) PCT Pub. No.: WO2014/147548
PCT Pub. Date: Sep. 25, 2014

(65) Prior Publication Data
US 2016/0053835 A1 Feb. 25, 2016

(30) Foreign Application Priority Data
Mar. 18, 2013 (IT) .............................. BS2013A0036

(51) Int. Cl.
*F16D 55/228* (2006.01)
*F16D 55/226* (2006.01)
(Continued)

(52) U.S. Cl.
CPC ........... *F16D 55/226* (2013.01); *F16D 55/22* (2013.01); *F16D 2055/002* (2013.01);
(Continued)

(58) Field of Classification Search
CPC ....... F16D 2055/002; F16D 2055/0066; F16D 2055/0091; F16D 2055/228;
(Continued)

(56) References Cited

U.S. PATENT DOCUMENTS 3,476,221 A * 11/1969 Schanz ............... F16D 65/0025
188/152
3,835,970 A * 9/1974 Haraikawa ............ F16D 55/224
188/345
(Continued)

FOREIGN PATENT DOCUMENTS

DE 1625781 A1 8/1970
DE 7405393 U 5/1974
(Continued)

OTHER PUBLICATIONS

European Patent Office; The International Search Report with Written Opinion; PCT/IB2014/059902; Jun. 24, 2014; European Patent Office, Rijswijk, Netherlands.
European Patent Office; Italian Search Report; IT BS20130036; Nov. 21, 2013; Munich Germany.

*Primary Examiner* — Bradley King
(74) *Attorney, Agent, or Firm* — Marshall & Melhorn, LLC

(57) ABSTRACT

A disc brake caliper, has a caliper body having a pair of half-calipers which define a housing compartment for a portion of an associable brake disc. The half-calipers being placed on opposite sides to the housing compartment in an axial direction parallel to the rotation axis of the associable brake disc. At least one half-caliper is fitted with at least one housing seat for a piston suitable to press a pad against the associable brake disc, in the axial direction. The housing seat passes through the respective half-caliper so as to extend between an inner wall facing the housing compartment and an outer wall of the half-caliper, axially opposite the housing compartment. A cup-shaped hollow insert is housed inside
(Continued)

the housing seat so as to present a closed end wall, placed on the side of the outer wall of the half-caliper, and a cavity having an aperture facing axially towards the housing compartment. At least one piston is housed inside the cavity of the insert and is guided axially by an inner side wall of the insert.

19 Claims, 9 Drawing Sheets

(51) Int. Cl.
    *F16D 55/22*     (2006.01)
    *F16D 55/00*     (2006.01)
    *F16D 125/04*     (2012.01)
    *F16D 125/06*     (2012.01)
    *F16D 125/08*     (2012.01)

(52) U.S. Cl.
    CPC .. *F16D 2055/0016* (2013.01); *F16D 2125/04* (2013.01); *F16D 2125/06* (2013.01); *F16D 2125/08* (2013.01)

(58) Field of Classification Search
    CPC ............. F16D 2125/04; F16D 2125/06; F16D 2125/08; F16D 55/228
    See application file for complete search history.

(56) References Cited

U.S. PATENT DOCUMENTS

| | | |
|---|---|---|
| 4,613,018 A | 9/1986 | Weiler et al. |
| 5,090,519 A * | 2/1992 | Golea ..................... F16D 65/18 |
| | | 188/370 |
| 5,105,917 A * | 4/1992 | Sporzynski ............ B21D 53/34 |
| | | 188/370 |
| 5,168,964 A * | 12/1992 | Shimmell ............. F16D 55/226 |
| | | 164/98 |
| 5,282,521 A | 2/1994 | Leist et al. |
| 7,905,336 B2 * | 3/2011 | Cortinovis ............... F16J 3/043 |
| | | 188/370 |
| 2002/0166736 A1 | 11/2002 | Yunba |
| 2006/0289249 A1 * | 12/2006 | Nishimura ............ F16D 55/226 |
| | | 188/72.4 |
| 2009/0255769 A1 * | 10/2009 | Kurita ................... F16D 55/228 |
| | | 188/370 |
| 2013/0020155 A1 * | 1/2013 | Crippa .................. F16D 55/228 |
| | | 188/73.31 |

FOREIGN PATENT DOCUMENTS

| | | |
|---|---|---|
| DE | 3336304 A1 | 4/1985 |
| DE | 3341480 A1 | 6/1985 |
| EP | 1256740 A2 | 11/2002 |
| FR | 1534694 A | 8/1968 |

* cited by examiner

DISC BRAKE CALIPER WITH REDUCED AXIAL DIMENSION

FIELD OF APPLICATION

The present invention relates to a disc brake caliper with reduced axial dimension, that is to say a disc brake caliper having a thickness reduced in an axial direction, parallel to the rotation axis of the associable brake disc.

STATE OF THE ART

In the automotive sector, with particular reference to vehicles in the low-medium range segments, there is a reduced space between the hub-bracket and the rim to house the disc brake calipers.

Consequently, calipers of the floating type are preferred given their reduced dimensions compared to the equivalent fixed calipers, which have larger dimensions, in particular in an axial direction, that is, parallel to the rotation axis of the associable brake disc.

It follows that the fixed calipers of the prior art cannot be fitted onto wheel groups having limited inner spaces.

PRESENTATION OF THE INVENTION

To resolve the aforesaid problems, some solutions of the prior art have been used up to today fitted with a caliper body in which the cylinders are made with a through hole in said caliper body and wherein said hole is closed by a plug to block the thrust piston of the pads destined to slide axially inside said hole.

Such solution is described for example in EP1256740.

The solutions of the prior art do not guarantee adequate resistance in the points of contact between the piston and the caliper body. Consequently, such fixed caliper body solutions with reduced axial dimensions are often relegated to less onerous applications as regards mechanical and thermic stress, such as for example to applications of the motorcycle type.

The need is thus felt to overcome the drawbacks and limitations mentioned with reference to the prior art.

Such need is satisfied by a disc brake caliper according to claim 1.

In particular, such need is satisfied by a disc brake caliper, comprising a caliper body having a pair of half-calipers which define a housing compartment for a portion of an associable brake disc, said half-calipers being positioned on opposite sides to the housing compartment in an axial direction parallel to the rotation axis of the associable brake disc, at least one half-caliper being fitted with at least one housing seat for a piston suitable to press a pad against the associable brake disc, in the axial direction, wherein the caliper is fitted with a hydraulic supply circuit of hydraulic fluid for the operation of said at least one piston, said hydraulic circuit comprising at least one supply duct which crosses a half-caliper at least partially. Advantageously the housing seat passes through the respective half-caliper so as to extend between an inner wall facing the housing compartment and an outer wall of the half caliper, axially opposite said housing compartment, wherein a cup-shaped hollow insert is housed inside the housing seat so as to present a closed end wall, placed on the outer side of the half-caliper, and a cavity having an aperture facing towards the housing compartment, wherein at least one piston is housed inside the cavity of the insert and is guided axially by an inner side wall of the insert. The supply duct intercepts a supply seat made between the insert and the housing seat, said supply seat being fluidically connected to the piston so as to be able to operate it under the thrust of the fluid.

According to one embodiment, the supply seat is axially comprised between the inner wall facing the housing compartment and the outer wall of the half-caliper.

According to one embodiment, the supply seat is a toroidal seat coaxial to the insert.

According to one embodiment, the supply seat, made between the insert and the housing seat, is axially positioned between a pair of sealing rings, placed between the insert and the housing seat.

According to one embodiment, the insert is fitted with at least one radial hole passing through a lateral thickness of said insert wherein said radial hole places the supply seat in communication with a recess between an inner side wall of the insert and a piston sleeve, said recess being in turn in fluidic connection with a base of the piston.

According to one embodiment, the insert has two radial holes passing through a lateral thickness of said insert and diametrically opposite each other, wherein said radial holes place the supply seat in communication with a recess between an inner side wall of the insert and a piston sleeve, said recess being in turn in fluidic connection with a base of the piston.

According to one embodiment, the base of the piston comprises an abutment suitable to create an interspace between the base and the end wall of the insert, the interspace being in communication with the supply seat so as to permit the passage of fluid of the braking circuit from the supply duct to the base of the piston.

According to one embodiment, the end wall of the insert is substantially flush with the outer wall of the corresponding half-caliper.

According to a possible embodiment, the insert axially houses the piston by at least half of its total axial extension.

According to a possible embodiment, the insert entirely covers the housing seat from the inner wall to the outer wall of the half-caliper so as to avoid contact between the piston and the housing seat of the half-caliper and axially guide the movement of the piston.

According to a possible embodiment, the insert is hydraulically connected to the hydraulic system of the caliper so as to receive the pressurised fluid and transmit the hydraulic thrust to the associable piston.

According to a possible embodiment, the insert is fitted with a stop collar which abuts against a corresponding shoulder made on the housing seat of the half caliper so as to form an undercut and prevent the axial loosening of the insert moving from the inner wall towards the outer wall of the half caliper.

According to a possible embodiment, the stop collar forms an interference coupling with the half-caliper, in an insertion direction which goes from the inner wall towards the outer wall of the half caliper.

According to a possible embodiment, the stop collar is positioned next to the aperture of the cavity of the insert and the inner wall of the half caliper.

According to a possible embodiment, the insert comprises an outer side wall which interfaces directly in contact with the housing seat made on the half-caliper and wherein at least one sealing ring is positioned between the outer side wall of the insert and the housing seat made on the half caliper.

According to a possible embodiment, the sealing ring is at least partially housed in a toroidal seat made on the outer side wall of the insert and/or portion of half-caliper defining the housing seat of said insert.

According to a possible embodiment, the at least one sealing ring is axially positioned between the stop collar and the outer wall of the half-caliper.

According to a possible embodiment, the inner side wall of the insert, which interfaces with said piston, comprises a portion calibrated to the outer diameter of the piston so as to axially guide the movement of the piston.

According to a possible embodiment, the inner side wall of the insert has no sealing elements According to a possible embodiment, a sealing sleeve having a toroidal shape is inserted between a head portion of the piston, which comes out from the inner wall of the half caliper and which abuts against an associable brake pad and the inner wall of said half-caliper.

According to a possible embodiment, the sealing sleeve is fitted with a plurality of bellow folds which extend in a radial direction R-R, perpendicular to the axial direction X-X and incident with an axis of symmetry of the piston.

According to a possible embodiment, the head of the piston is fitted with a recess which a first attachment end of the sealing sleeve is inserted in.

According to a possible embodiment, the half-caliper comprises an attachment hook which blocks a second end of said sealing sleeve next to the inner wall of the half caliper.

According to a possible embodiment, the insert is made from a material having a higher elastic modulus than the material which the half-caliper is made from.

According to a possible embodiment, the insert is made from steel and the half-caliper is made from aluminium or an aluminium alloy.

According to a possible embodiment, the piston comprises a base, facing the bottom of the insert and wherein said base comprises a plurality of ribs and/or recesses.

DESCRIPTION OF THE DRAWINGS

Further characteristics and advantages of the present invention will be more clearly comprehensible from the description given below of its preferred and non-limiting embodiments, wherein:

FIG. 3b shows a cross-section view of the caliper in FIG. 1, along the cross-section plane III-III in FIG. 3a;

The elements or parts of elements common to the embodiments described below will be indicated using the same reference numerals.

DETAILED DESCRIPTION

Figure 1:
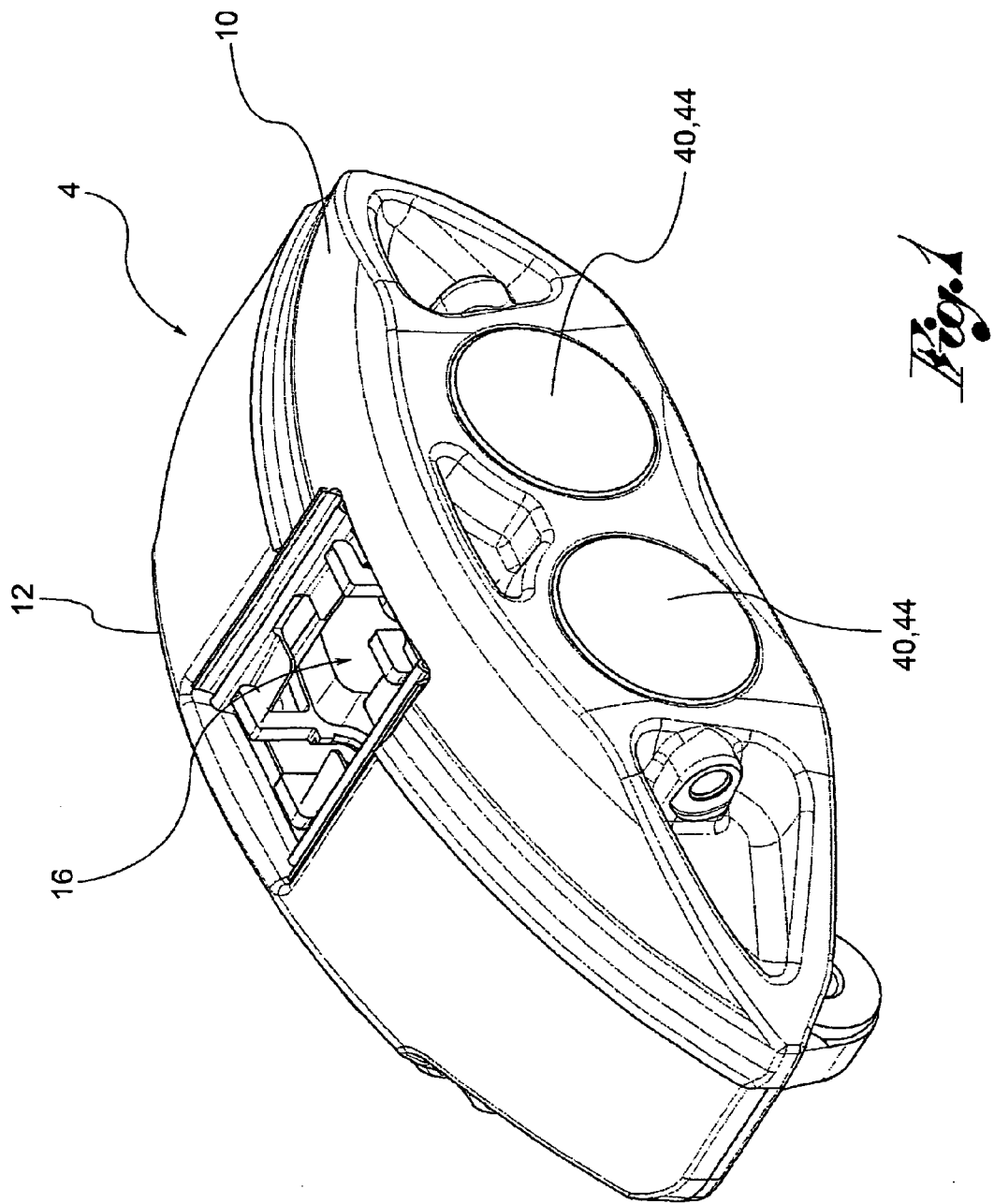
FIG. 1 shows views, partially in cross-section, of a disc brake caliper according to the present invention.

With reference to the aforementioned figures, reference numeral 4 globally denotes a disc brake caliper, comprising a caliper body 8 having a pair of half-calipers 10, 12 which define a housing compartment 16 for a portion of an associable brake disc not shown.

The half-calipers 10, 12 are positioned on opposite sides to the housing compartment 16 in an axial direction X-X parallel to the rotation axis of the associable brake disc. Said axial direction X-X is also parallel to the direction of movement of the thrust pistons of the pads of the caliper 4 as specified further below.

The half-calipers 10, 12 may be separate from each other and joined for example by mechanical coupling means, or the half-calipers 10,12 may be made in one piece, by means of a caliper body 8 of the monobloc type.

At least one half-caliper 10, 12 is fitted with at least one housing seat 20 for a piston 24 suitable to press a pad 28 against the associable brake disc, in the axial direction X-X.

In the case of a caliper of the fixed type, each half-caliper 10, 12 comprises at least one housing seat which houses a relative piston 24; the number of housing seats 20 and of relative pistons 24 housed therein may also be multiple.

In the case of calipers 4 of the floating type, only one half-caliper, called floating body, is fitted with at least one piston 24; said floating body is in fact fitted so as to slide on a fixed portion or half-caliper, called bracket, which houses at least one pad but which is without pistons.

The present invention is aimed mainly at applications on calipers of the fixed type but may also be applied to floating caliper solutions.

The caliper is fitted with a hydraulic supply circuit of hydraulic fluid for the operation of said at least one piston 24, said hydraulic circuit comprising at least one supply duct 26 which crosses a half-caliper 10, 12 at least partially.

In the case of a caliper fitted with a plurality of pistons 24 the hydraulic circuit may comprise intermediate ducts 27 which fluidically connect to each other adjacent pistons placed on the same half-caliper 10, 12.

The housing seat 20 of at least one piston 24 passes through the respective half-caliper 10, 12 so as to extend between an inner wall 32 facing the housing compartment 16 and an outer wall 36 of the half-caliper 10, 12, axially opposite said housing compartment 16.

In other words, the housing seat 20 constitutes a hole passing entirely through the half-caliper 10, 12 which places the housing compartment 16 in communication with the outer wall 36.

The housing seat 20 is typically a cylindrical seat having an axis of symmetry parallel to said axial direction X-X.

Advantageously, a cup-shaped hollow insert 40 is housed inside the housing seat 20 so as to present a closed end wall 44, placed on the side of the outer wall 36 of the respective half-caliper 10, 12, and a cavity 48 having an aperture 52 facing axially towards the housing compartment 16.

Preferably, the insert 40 is made from a material having a higher elastic modulus than the material which the half-caliper 10, 12 is made from.

For example, the insert 40 is made from steel and the half-caliper 10, 12 is made from aluminium or an aluminium alloy.

The insert 40 may be made of different material, such as for example in composite material, in carbon, in ceramic material ad/or plastic reinforced with carbon and the like.

The insert 40 is preferably a cylindrical shape, that is to say is coaxial with the housing seat 20 and is axial symmetric to an axis of symmetry parallel to the axial direction X-X.

The at least one piston 24 is housed inside the cavity 48 of the insert 40 and is guided axially by an inner side wall 56 of the insert 40.

The piston 24 comprises a sleeve 57 which interfaces with the cavity of the insert 40, a base 58 axially facing the closed end wall 44 of the insert 40, and a head 59 placed on the side opposite the base 58 and directly facing the associable pad 28.

The sleeve 57 guides the axial sliding of the piston 24; the base receives the thrust from the fluid pressurised by the piston and the head 59 interfaces with the pad to push it against the associable brake disc.

According to one embodiment, the base 58 of the piston 24 facing the bottom 44 of the insert 40 comprises a plurality of ribs and/or recesses 61; such ribs and/or recesses are preferably arranged in a spoke pattern. The ribs or recesses 61 form a structural stiffening of the base 58 of the piston 24.

An interspace 63 is present between the base 58 of the piston 24 and the closed end wall 44 of the insert 40 suitable to permit the passage of pressurised hydraulic fluid so as to be able to exercise an axial thrust on the piston 24, parallel to the axial direction X-X, so as to be able to push the pads 28 against the associable brake disc.

Preferably, the insert 40 axially houses the piston 24 by at least half of its total axial extension.

Even more preferably, the insert 40 axially houses the piston 24 for its entire length except for the head of the piston 24 which abuts against the pad, as further described below.

Preferably, the insert 40 entirely covers the housing seat 20 from the inner wall 32 to the outer wall 36 of the half-caliper 10, 12 so as to avoid contact between the piston 24 and the housing seat 20 of the half-caliper 10, 12 and axially guide the movement of the piston 24.

The insert 40 is hydraulically connected to the hydraulic system of the caliper so as to internally receive the pressurised fluid and transmit the hydraulic thrust to the associable piston 24.

According to one embodiment, the insert 40 is fitted with a stop collar 60 which abuts against a corresponding shoulder 64 made on the housing seat 20 of the half-caliper 10, 12 so as to form an undercut and prevent the axial loosening of the insert 40 moving from the inner wall 32 towards the outer wall 36 of the half-caliper 10, 12.

According to one embodiment, said stop collar 60 forms an interference coupling with the half-caliper 10, 12, in an insertion direction which goes from the inner wall 32 towards the outer wall 36 of the half-caliper 10, 12.

Preferably, said stop collar 60 is positioned next to the aperture 52 of the cavity 48 of the insert 40 and the inner wall 32 of the half-caliper 10, 12.

According to one embodiment, the insert 40 comprises an outer side wall 68 which interfaces directly in contact with the housing seat 20 made on the half-caliper 10, 12.

The supply duct intercepts a supply seat made 69 between the insert 40 and the housing seat 20, said supply seat 69 being fluidically connected to the piston 24 so as to be able to operate it under the thrust of the fluid.

It is to be noted that the supply seat 69 may be made in the insert 40, in the housing seat 20 and even at least partially both in the insert 40 and in the housing seat 20.

The supply seat 69 is axially comprised between the inner wall 32 facing the housing compartment 16 and the outer wall 36 of the half-caliper 10, 12.

According to one embodiment, said supply seat 69 is a toroidal seat coaxial to the insert 40.

Preferably, the supply seat 69, made between the insert 40 and the housing seat 20, is axially positioned between a pair of sealing rings 72, generally o-rings, placed between the insert 40 and the housing seat 20.

The insert 40 is fitted with at least one radial hole 73 passing through a lateral thickness 74 of said insert 40, wherein said radial hole 73 places the supply seat 69 in communication with a recess 82 between the inner side wall 56 of the insert 40 and the sleeve 57 of the piston 24, said recess 82 being in turn in fluidic connection with the base 58 of the piston 24.

For example, the insert 40 has two radial holes 73 passing through a lateral thickness 74 of said insert 40, and diametrically opposite each other, wherein said radial holes 73 place the supply seat 69 in communication with a recess 82 between an inner side wall 56 of the insert 40 and the sleeve 57 of the piston 24; said recess 82 being in turn in fluidic connection with the base 58 of the piston 24.

It is to be noted that the at least one radial hole need not necessarily be angularly aligned with the supply ducts.

According to one embodiment, the base 58 of the piston 24 comprises an abutment 88 suitable to create an interspace 63 between the base 58 and the end wall 44 of the insert 40, the interspace 63 is in communication with the supply seat 69 so as to permit the passage of fluid of the braking circuit from the supply duct 26 to the base 58 of the piston 24.

Preferably, the end wall 44 of the insert 40 is substantially flush with the outer wall 36 of the corresponding half-caliper 10, 12.

According to a further possible embodiment, the end wall 44 may be recessed in relation to the outer wall 36 of the corresponding half-caliper 10,12; in other words, the end wall may be axially contained inside the housing seat 20.

Said sealing ring 72 is at least partially housed in a toroidal seat made on the outer side wall 68 of the insert 40 and/or on the portion of half-caliper 10, 12 which defines the housing seat 20 of said insert.

Preferably, the at least one sealing ring 72 is axially positioned between the stop collar 60 and the outer wall 36 of the half-caliper 10, 12.

Preferably, the inner side wall 56 of the insert 40, which interfaces with said piston 24, comprises a portion 76 calibrated to the outer diameter of the piston 24 so as to axially guide the movement of the piston 24; preferably, the inner side wall 56 of the insert 40 comprises at least one circumferential seat 80 which houses a gasket 81. The gasket 81 makes a hydraulic seal, slidingly interfacing with the sleeve 57 of the piston 24 during the stroke of said piston.

According to one embodiment, a sealing sleeve 84 having a toroidal shape is inserted between a head portion 59 of the piston 24, which comes out from the inner wall 32 of the half-caliper 10, 12 and which abuts against an associable brake pad and the inner wall 32 of said half-caliper 10, 12.

Preferably, the sealing sleeve 84 is fitted with a plurality of bellow folds 88 which extend in a radial direction R-R, perpendicular to the axial direction X-X and incident with an axis of symmetry of the piston 24.

According to one embodiment, the head 59 of the piston 24 is fitted with a recess 92 which a first attachment end 96 of the sealing sleeve 84 is inserted in.

According to one embodiment, the half-caliper 10,12 comprises an attachment hook 100 which blocks a second end 104 of said sealing sleeve 84 next to the inner wall 32 of the half-caliper 10, 12.

In particular, the attachment hook attaches to the half-caliper 10, 12 at the inner wall 32 on the side axially opposite the shoulder 64. In other words, following the assembly of the sealing sleeve 84, the stop collar 60 of the insert 40 proves axially constrained in a bilateral manner respectively by the attachment hook 100, which prevents the axial shift of the insert towards the housing compartment 16, and by the shoulder 64 which prevents the axial shift of the insert 40 towards the outer wall 36.

The attachment hook 100 is substantially a ring which, after being fitted onto the insert 40, dilates radially so as to press against the housing seat 20 of the half-caliper 10, 12 so as to ensure the blocking of the insert 40 even in the case of elevated thermic stresses.

As mentioned, the invention is applicable to both fixed and floating calipers; in addition it is possible to apply it to just one half-caliper 10 of a caliper of the fixed type, so as to limit the axial dimensions for example on the side of the caliper interfacing between the hub bracket and the rim; in yet other words it is possible to apply the invention asymmetrically to just one half-caliper of a caliper of the fixed type.

As may be appreciated from the description the disc brake caliper according to the invention makes it possible to overcome the drawbacks of the prior art.

In particular, the disc brake caliper has particularly reduced axial dimensions compared to the solutions of the prior art.

In fact, the brake fluid is not injected in the pistons directly from the side of the base or end, but from the sleeve side and subsequently channeled by means of the recess made between the insert and the piston; this way the overall axial dimensions of the caliper are reduced. In fact, it is no longer necessary, as in the solutions of the prior art, to provide a supply duct on the side of the end or base of the piston which projects axially from the outer wall of the caliper body.

Figure 2:
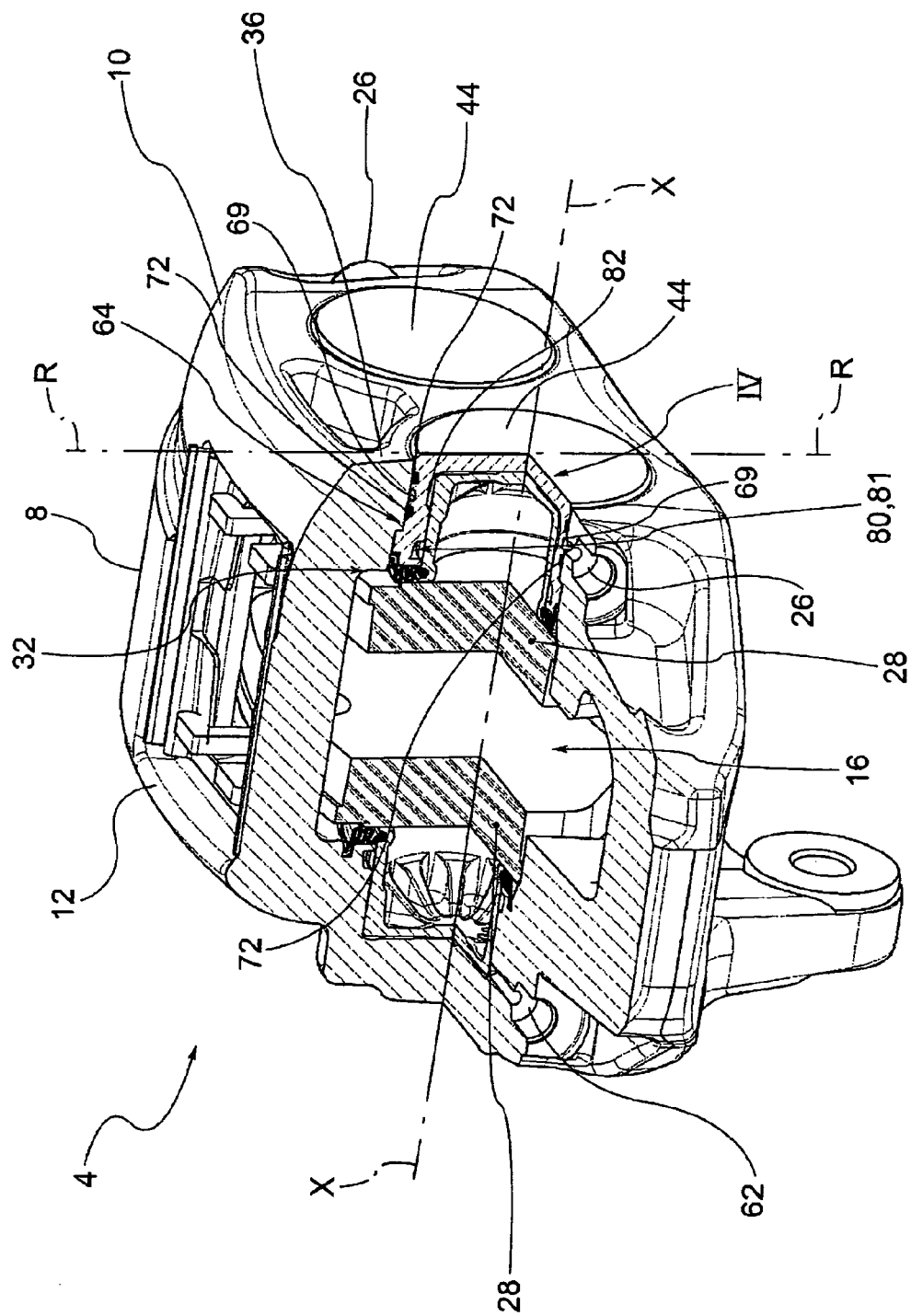
FIGS. 2, 3a shows views in partial cross-section of the caliper in FIG. 1, at different angles.
Figure 3A:
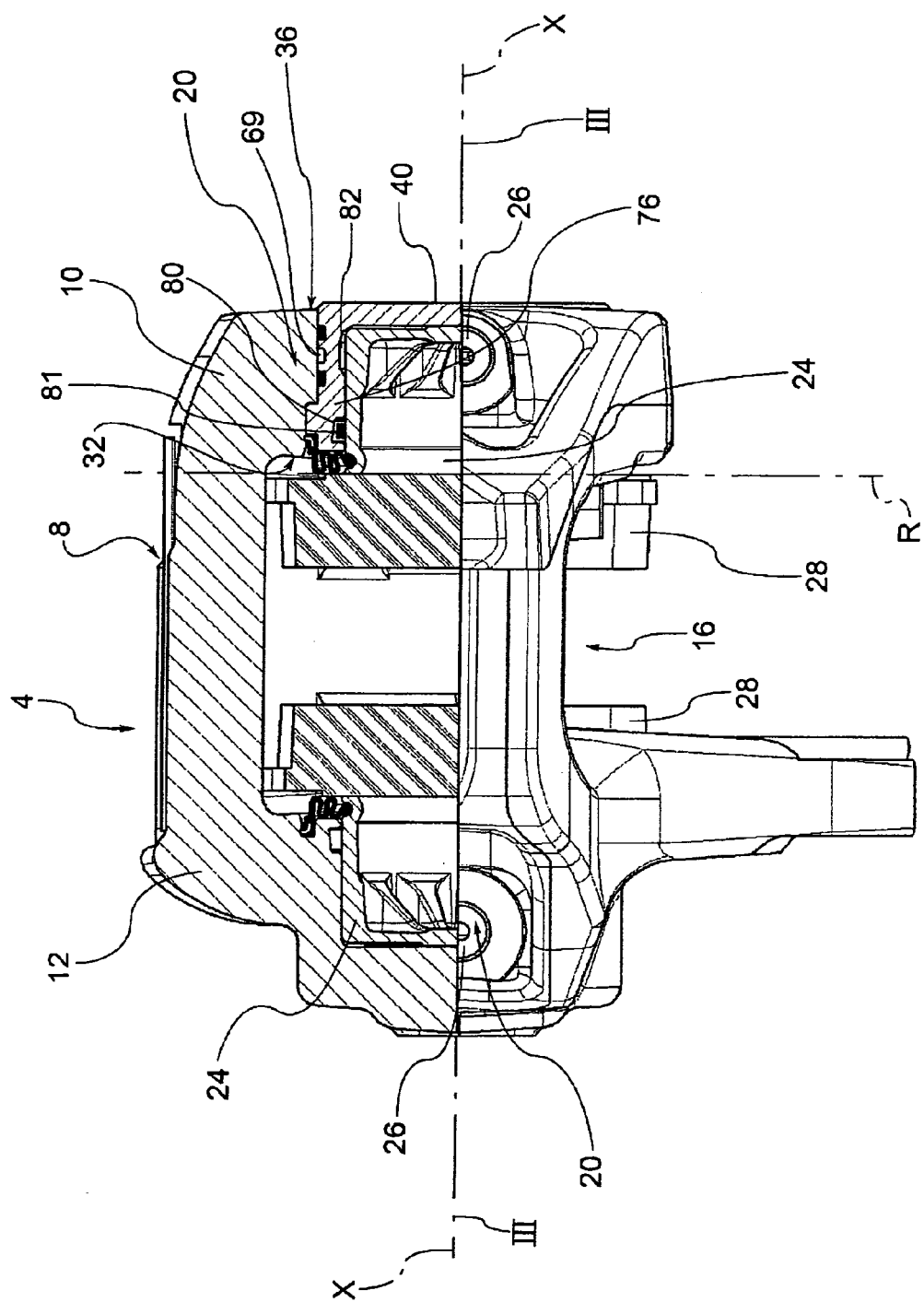
Figure 3B:
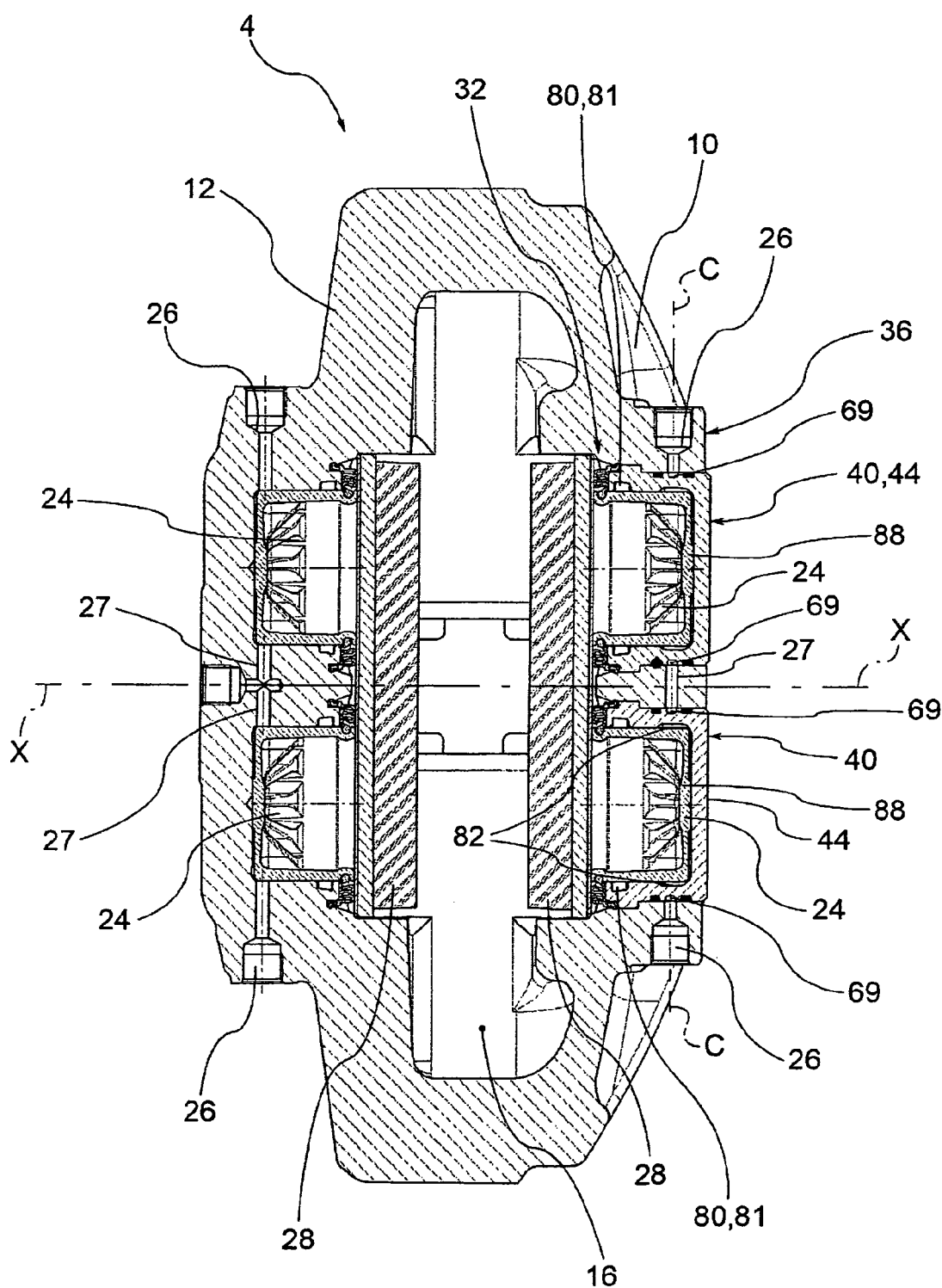
Figure 3C:
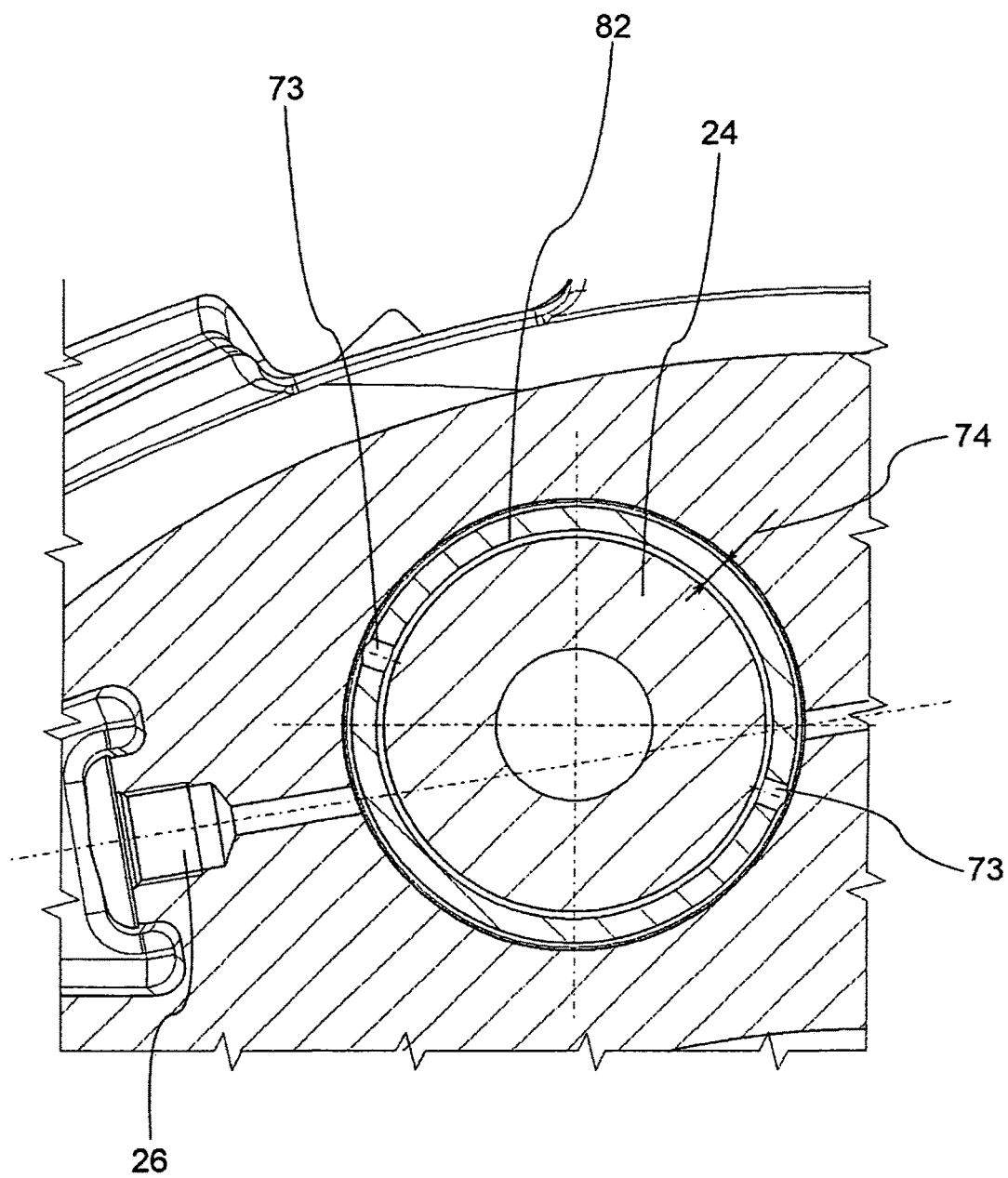
FIG. 3c shows an enlarged detail, in cross-section, of a caliper according to the invention, along the cross-section plane C-C in FIG. 3b.
Figure 4:
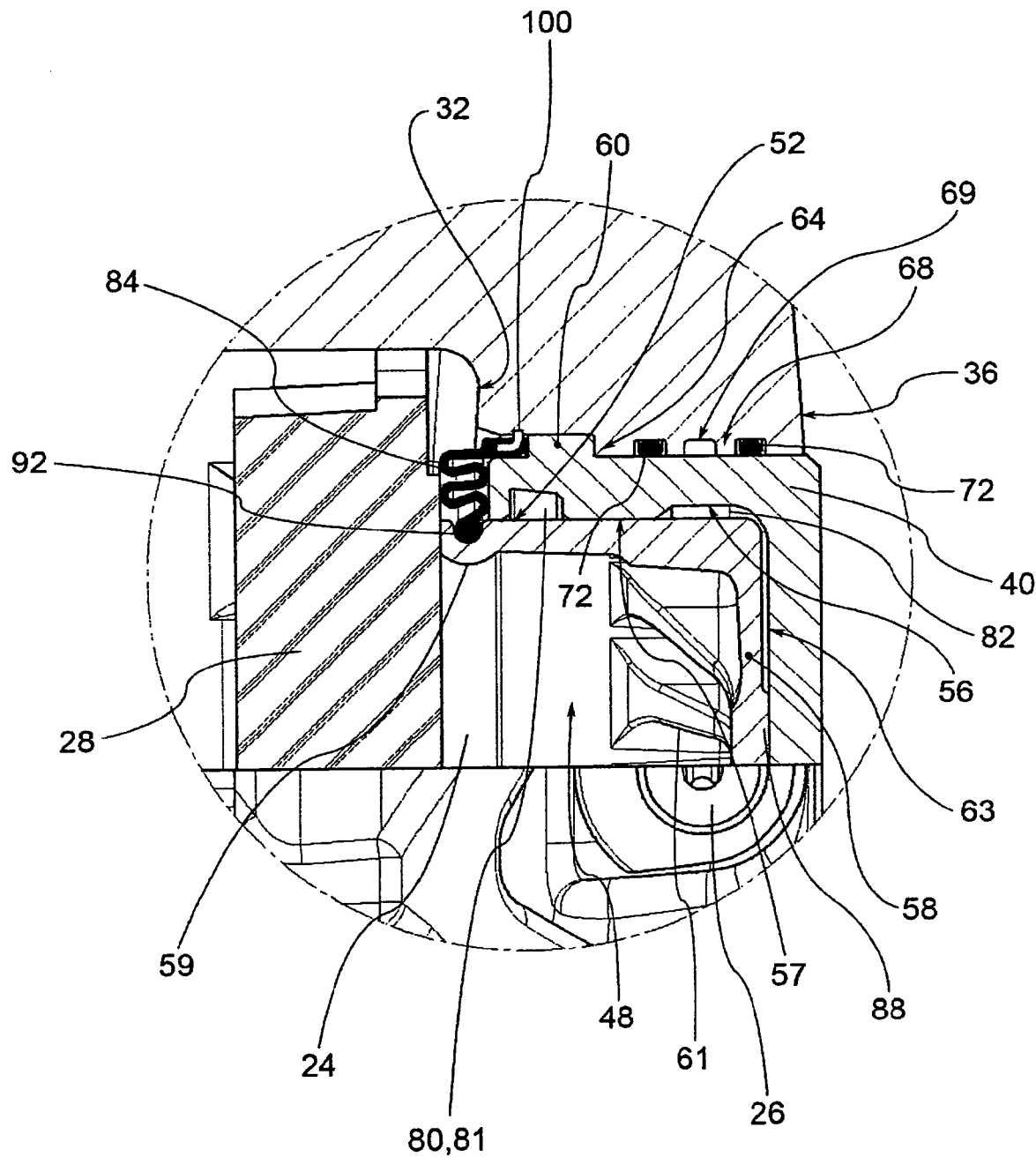
FIGS. 4-5 show cross-section views of the enlarged detail IV in FIG. 2, according to two different embodiments of the present invention.
Figure 5:
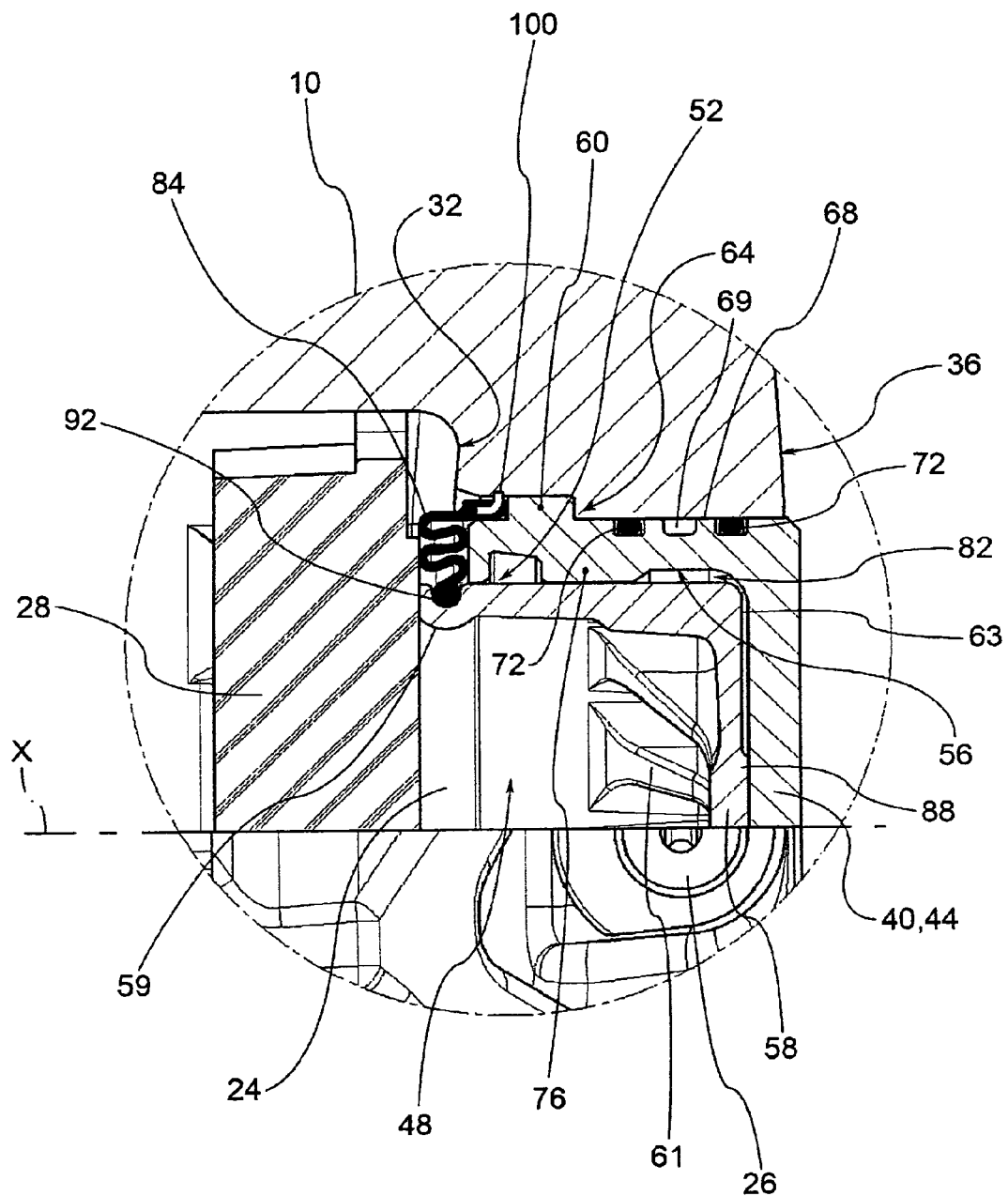
Figure 6:
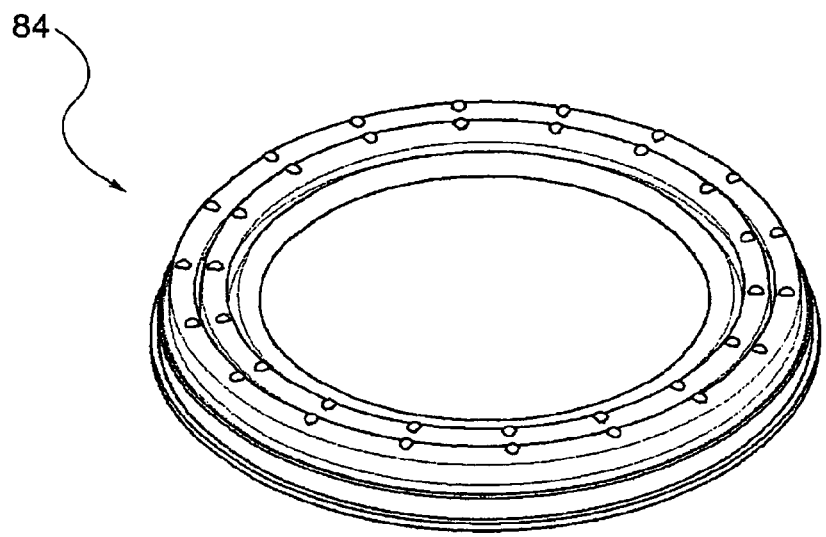
FIGS. 6-7 respectively show a perspective view and a cross-section view of a detail of the caliper according to the present invention.
Figure 7:
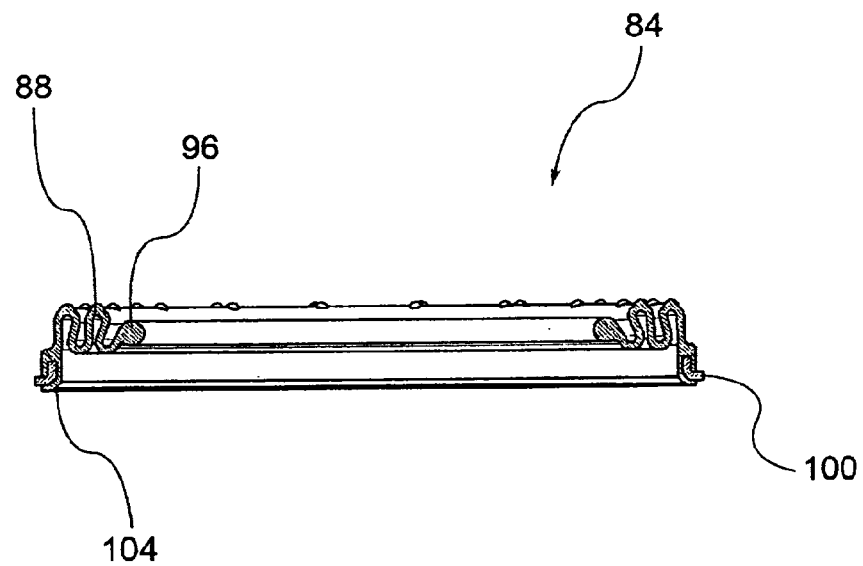
Figure 8:
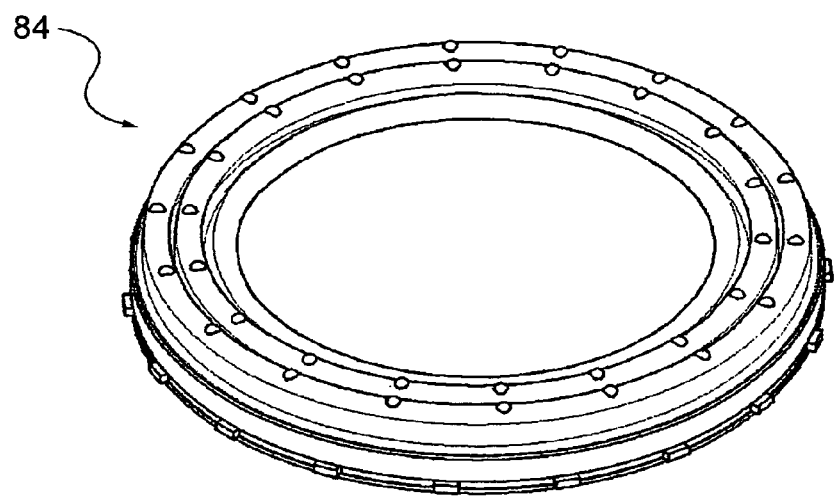
FIGS. 8-9 respectively show a perspective view and a cross-section view of a detail of the caliper according to a further embodiment of the present invention.
Figure 9:
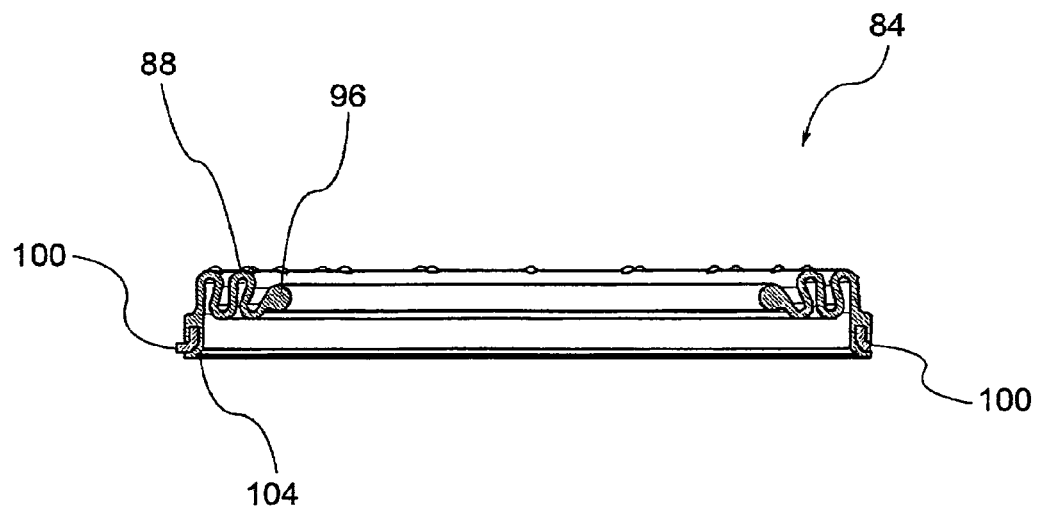

One example of the significant saving of axial space resulting from such solution is shown in FIGS. 2, 3a, 3b in which the significant reduction of the axial dimensions of a half-caliper 10 resulting from the use of housing inserts of the pistons and the absence of supply ducts with an axial input on the caliper body may be noted; instead the other half-caliper 12, without inserts and provided with axial supply ducts presents, for the same number and size of pistons, a significantly greater axial dimension.

It is possible for example to apply reduced axial dimension fixed calipers to wheel groups having reduced spaces available.

It is also possible to apply such solution to just one half-caliper of a caliper of the fixed type.

In any case, it is also possible to apply such solution to floating caliper solutions, in particular to the axially mobile portion, in relation to the fixed bracket, fitted with at least one thrust piston.

In addition, the piston seat, made in material having a higher elasticity modulus than that of the half-caliper, for example steel, makes it possible to reduce the dimension of the caliper, compared to a traditional caliper with the cylinder made in the caliper body, while maintaining the necessary resistance to the force of reaction exercised by the piston.

This way, it is possible to use extremely lightweight materials for the caliper body, without increasing the thicknesses in the points of elevated mechanical stresses, such as for example the housing seats of the piston which are instead made by inserting inserts made of more resistant material so as to guarantee mechanical resistance while keeping the axial dimensions and weight of the components to a minimum.

It is furthermore possible to vary the material of the inserts, in relation to those of the caliper body, so as to achieve specific combinations, for example having reduced friction. It is, furthermore, possible to easily attach coatings to the inner side wall of the insert so as to facilitate the sliding of the piston therein.

It is also possible to avoid the use of any seal between the insert and the outer side wall of said piston.

This way, among other things, the seals can be positioned in areas between the insert and half-caliper which are mechanically and thermally less stressed: this way the seals are less stressed and the risk of possible leakage of brake fluid is prevented. In fact the seals are positioned on fixed, less thermally stressed walls: consequently there is no rubbing action on said seals.

In addition, the sealing sleeve, positioned on the head of the piston, is able not only to guarantee the hermetic seal of the brake fluid but also to elastically influence the pistons in an axial direction, for example so as to ensure the rearward movement of the piston, and thus the detachment of the pad from the braking band of the brake disc.

Such rearward movement is facilitated by the fact that the piston slides directly on the inner calibrated side wall of the insert without the interposition of sealing rings.

Thanks to the present invention it is thus possible to reduce the axial dimensions of the caliper body without jeopardising the mechanical resistance of the said caliper body and thus without excessive deformation of the caliper body even in demanding conditions of use.

In addition, the presence of the insert significantly limits the transmission of heat from the piston which heats through the pad, to said caliper body: such transmission of heat is in fact partially limited by the interposition of the insert which does not permit a direct contact, and thus a direct transmission of heat from the piston to the caliper body.

A person skilled in the art may make numerous modifications and variations to the disc brake calipers described above so as to satisfy contingent and specific requirements while remaining within the sphere of protection of the invention as defined by the following claims.

The invention claimed is:

1. A disc brake caliper, comprising a caliper body having a pair of half-calipers which define a housing compartment for a portion of an associable brake disc, said half-calipers being placed on opposite sides to the housing compartment in an axial direction parallel to the rotation axis of the associable brake disc, at least one half-caliper being fitted with at least one housing seat for a piston suitable to press a pad against the associable brake disc, in the axial direction, wherein the caliper is fitted with a hydraulic supply circuit of hydraulic fluid for the operation of said at least one piston, said hydraulic circuit comprising at least one supply duct which crosses a half-caliper at least partially, characterised in that the housing seat passes through the respective half-caliper so as to extend between an inner wall facing the housing compartment and an outer wall of the half-caliper, axially opposite said housing compartment, wherein a cup-shaped hollow insert is housed inside the housing seat so as to present a closed end wall, placed on the side of the outer wall of the half-caliper, and a cavity having an aperture facing axially towards the housing compartment, wherein at least one piston is housed inside the cavity of the insert and is guided axially by an inner side wall of the insert, wherein the supply duct intercepts a supply seat made between the insert and the housing seat, said supply seat being fluidically connected to the piston so as to be able to operate it under the thrust of the fluid;

wherein the at least one piston has a piston head that extends axially beyond the insert and the half-caliper inner wall to abut the associable brake pad, the piston head having a radially outward circumferential recess;

wherein a first end of a sealing sleeve is located in said piston head recess and a ring shaped attachment hook is located in a second end of the sealing sleeve to engage the half-caliper inner wall; and wherein a plurality of bellow folds are between the first end and the second end of the sealing sleeve and between the insert and the associable brake pad.

2. The disc brake caliper according to claim 1, wherein said supply seat is axially comprised between the inner wall facing the housing compartment and the outer wall of the half-caliper.

3. The disc brake caliper according to claim 1, wherein said supply seat is a toroidal seat coaxial to the insert.

4. The disc brake caliper according to claim 1, wherein said supply seat made between the insert and the housing seat, is axially positioned between a pair of sealing rings, placed between the insert and the housing seat.

5. The disc brake caliper according to claim 1, wherein the insert is fitted with at least one radial hole passing through a lateral thickness of said insert, wherein said radial hole places the supply seat in communication with a recess between the inner side wall of the insert and the sleeve of the piston, said recess being in turn in fluidic connection with the base of the piston.

6. The disc brake caliper according to claim 1, wherein the insert has two radial holes passing through a lateral thickness of said insert, and diametrically opposite each other, wherein said radial holes place the supply seat in communication with a recess between an inner side wall of the insert and the sleeve of the piston, said recess being in turn in fluidic connection with the base of the piston.

7. The disc brake caliper according to claim 1, wherein the base of the piston comprises an abutment suitable to create an interspace between the base and the end wall of the insert, the interspace being in communication with the supply seat so as to permit the passage of fluid of the braking circuit from the supply duct to the base of the piston.

8. The disc brake caliper according to claim 1, wherein the end wall of the insert is substantially flush with the outer wall of the corresponding half-caliper.

9. The disc brake caliper according to claim 1, wherein the insert axially houses the piston by at least half of a total axial extension of the piston.

10. The disc brake caliper according to claim 1, wherein the insert entirely covers the housing seat from the inner wall to the outer wall of the half-caliper so as to avoid contact between the piston and the housing seat of the half-caliper and axially guide the movement of the piston.

11. The disc brake caliper according to claim 1, wherein the insert is hydraulically connected to the hydraulic system of the caliper so as to internally receive the pressurized fluid and transmit the hydraulic thrust to the associable piston.

12. The disc brake caliper according to claim 1, wherein the insert is fitted with a stop collar which abuts against a corresponding shoulder made on the housing seat of the half-caliper so as to form an undercut and prevent the axial loosening of the insert moving from the inner wall towards the outer wall of the half-caliper.

13. The disc brake caliper according to claim 1, wherein the inner side wall of the insert, which interfaces with said piston, comprises a portion calibrated to the outer diameter of the piston so as to axially guide the movement of the piston.

14. The disc brake caliper according to claim 1, wherein the sealing sleeve having a toroidal shape is inserted between the head of the piston, which comes out from the inner wall of the half-caliper, the head portion of the piston abuts against an associable brake pad.

15. The disc brake caliper according to claim 14, wherein the sealing sleeve is fitted with the plurality of bellow folds which extend in a radial direction, perpendicular to the axial direction and incident with an axis of symmetry of the piston.

16. The disc brake caliper according to claim 14, wherein the sealing sleeve comprises the attachment hook which blocks a second end of said sealing sleeve next to the inner wall of the half-caliper.

17. The disc brake caliper according to claim 1, wherein the insert is made from a material having a higher elastic modulus than the material which the half-caliper is made from.

18. The disc brake caliper according to claim 1, wherein the insert is made from steel and the half-caliper is made from aluminum or an aluminum alloy.

19. The disc brake caliper according to claim 1, wherein the piston comprises a base, facing the closed end wall of the insert and wherein said base comprises a plurality of ribs and/or recesses.

* * * * *